US011554946B1

(12) United States Patent
Feng

(10) Patent No.: US 11,554,946 B1
(45) Date of Patent: Jan. 17, 2023

(54) SUPERCHARGER AND CARBONATED WATER MIXING DEVICE

(71) Applicant: C18 LLC, Lake Worth, FL (US)

(72) Inventor: Yao Feng, Lake Worth, FL (US)

(73) Assignee: C18 LLC, Lake Worth, FL (US)

( * ) Notice: Subject to any disclaimer, the term of this patent is extended or adjusted under 35 U.S.C. 154(b) by 0 days.

(21) Appl. No.: 17/699,373

(22) Filed: Mar. 21, 2022

(51) Int. Cl.
*B67D 1/00* (2006.01)
*A23L 2/54* (2006.01)
*B67D 1/12* (2006.01)

(52) U.S. Cl.
CPC ............. *B67D 1/12* (2013.01); *B67D 1/0057* (2013.01)

(58) Field of Classification Search
CPC ....... B67D 1/12; B67D 1/0057; B01F 23/236; B01F 23/237621; B01F 23/23765; B01F 23/29; B01F 23/31331; A23L 2/54
USPC ...................... 261/84; 426/67; 222/61, 129.1
See application file for complete search history.

(56) References Cited

U.S. PATENT DOCUMENTS 1,370,213 A * 3/1921 Jacoby .................. B01F 23/236 99/323.2
4,672,813 A * 6/1987 David ....................... F02F 3/22 384/111
7,823,398 B2 * 11/2010 Glen ..................... F01C 11/004 62/401
8,177,197 B1 * 5/2012 Ergican ................. B01F 23/232 261/78.2
8,191,867 B2 6/2012 Spiegel
9,440,836 B2 * 9/2016 Quittner ................ B01F 25/621
9,718,035 B2 * 8/2017 Bandixen .............. B01F 25/431
10,947,931 B2 3/2021 McHenry et al.
11,199,093 B2 * 12/2021 Yadegar ..................... F01D 1/34
2018/0200683 A1 * 7/2018 Lopes ............. B01F 25/431971
2020/0047137 A1 2/2020 Wilder et al.
2021/0094004 A1 * 4/2021 Humphrey ............ F16K 15/063

FOREIGN PATENT DOCUMENTS

CN 112439335 A 3/2021
CN 212640057 U 3/2021
KR 20180000043 A 1/2018

OTHER PUBLICATIONS

International Search Report and Written Opinion issued in counterpart PCT Application No. PCT/US2022/021135, dated Jun. 22, 2022.

* cited by examiner

*Primary Examiner* — Charles P. Cheyney
(74) *Attorney, Agent, or Firm* — Westbridge IP LLC

(57) ABSTRACT

Disclosed are a supercharger and a carbonated water mixing device. The supercharger includes a housing. An accommodating cavity is formed in the housing, the housing is provided with a gas-liquid inlet and an outlet communicating with the accommodating cavity, an impact interface is provided in the accommodating cavity, and the gas-liquid inlet is configured for a gas-liquid mixture to enter the accommodating cavity and impact on the impact interface.

8 Claims, 5 Drawing Sheets

SUPERCHARGER AND CARBONATED WATER MIXING DEVICE

TECHNICAL FIELD

The present disclosure relates to the technical field of superchargers, and in particular to a supercharger and a carbonated water mixing device.

BACKGROUND

Carbonated water is a common and popular beverage, which is mainly produced by dissolving large amounts of carbon dioxide in water. In the related art, carbonated water is produced by mixing in pressure tanks. It is necessary to inject carbon dioxide or liquid with a preset pressure into the pressure tank in advance, and then inject high-pressure liquid or carbon dioxide at the carbonated water mixing device to use high-pressure shock to dissolve carbon dioxide in the liquid. This production method has high requirements on shock pressure such as water level or gas pressure, and is not convenient to use, and the high-pressure shock method is prone to the risk of the pressure tank being punched open or exploding.

The foregoing description is to provide general background information and does not necessarily constitute prior art.

SUMMARY

The main purpose of the present disclosure is to provide a supercharger and a carbonated water mixing device, which aims to improve the use safety and convenience of the carbonated water mixing device.

In order to achieve the above objective, the present disclosure provides a supercharger, including: a housing. An accommodating cavity is formed in the housing, the housing is provided with a gas-liquid inlet and an outlet communicating with the accommodating cavity, an impact interface is provided in the accommodating cavity, and the gas-liquid inlet is configured for a gas-liquid mixture to enter the accommodating cavity and impact on the impact interface.

Other features of the present disclosure and corresponding benefits are explained in the later part of the specification.

The solution to the technical problem of the present disclosure is as follows. An impact interface is provided in the accommodating cavity of the housing. When the gas-liquid mixture with the preset pressure is injected into the accommodating cavity from the gas-liquid inlet, the gas-liquid mixture is instantly stationary due to the impact on the impact interface, it is possible to generate an instantaneous pressure several times the normal pressure under the action of inertia, so that carbon dioxide is dissolved in the liquid, and the solubility of carbon dioxide in the liquid is improved. That is, the technical solution of the present disclosure utilizes the supercharger for gas-liquid mixing, so that high-pressure carbon dioxide up to 50-70 MPa is not required to be injected into the liquid storage bottle and mixed with the liquid, which avoids the problem that the liquid storage bottle is flushed or the liquid storage bottle explodes caused by using high-pressure carbon dioxide. This solution completely does not use the liquid storage bottle, and adopts the method of instant mixing, such that the user can use a cup to directly access carbonated water at the carbonated water mixing device, thereby improving the use safety and convenience of the carbonated water mixing device.

The shapes, sizes, proportions or positional relationships of product components shown in the accompanying drawings can be real data of the embodiments, and belong to the protection scope of the present disclosure.

DETAILED DESCRIPTION OF THE EMBODIMENTS

In order to make the objectives, technical solutions and advantages of the present disclosure more clearly understood, the embodiments of the present disclosure will be further described in detail below through specific embodiments in conjunction with the accompanying drawings. It should be understood that the specific embodiments described herein are only used to explain the present disclosure, but not to limit the present disclosure.

The present disclosure provides a supercharger 100.

Figure 1:
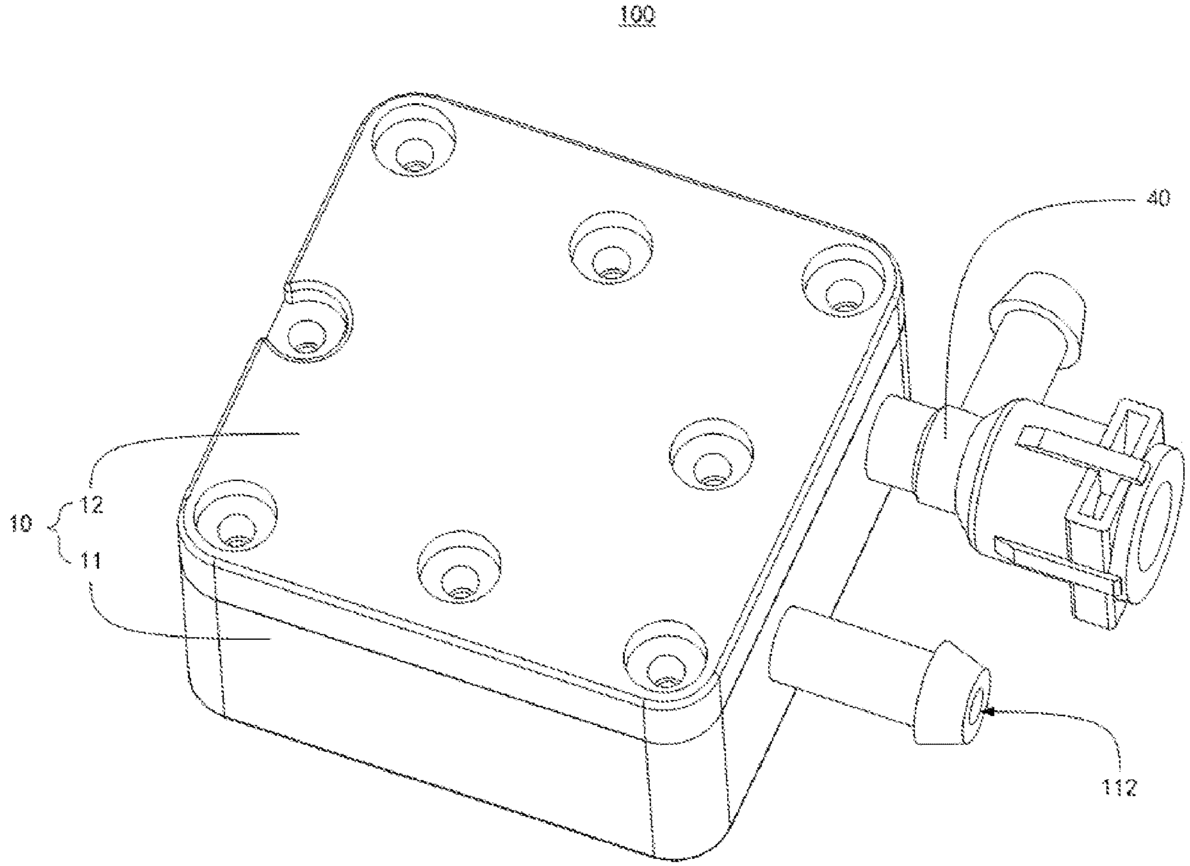
FIG. 1 is a structural view of a supercharger according to an embodiment of the present disclosure.
Figure 2:
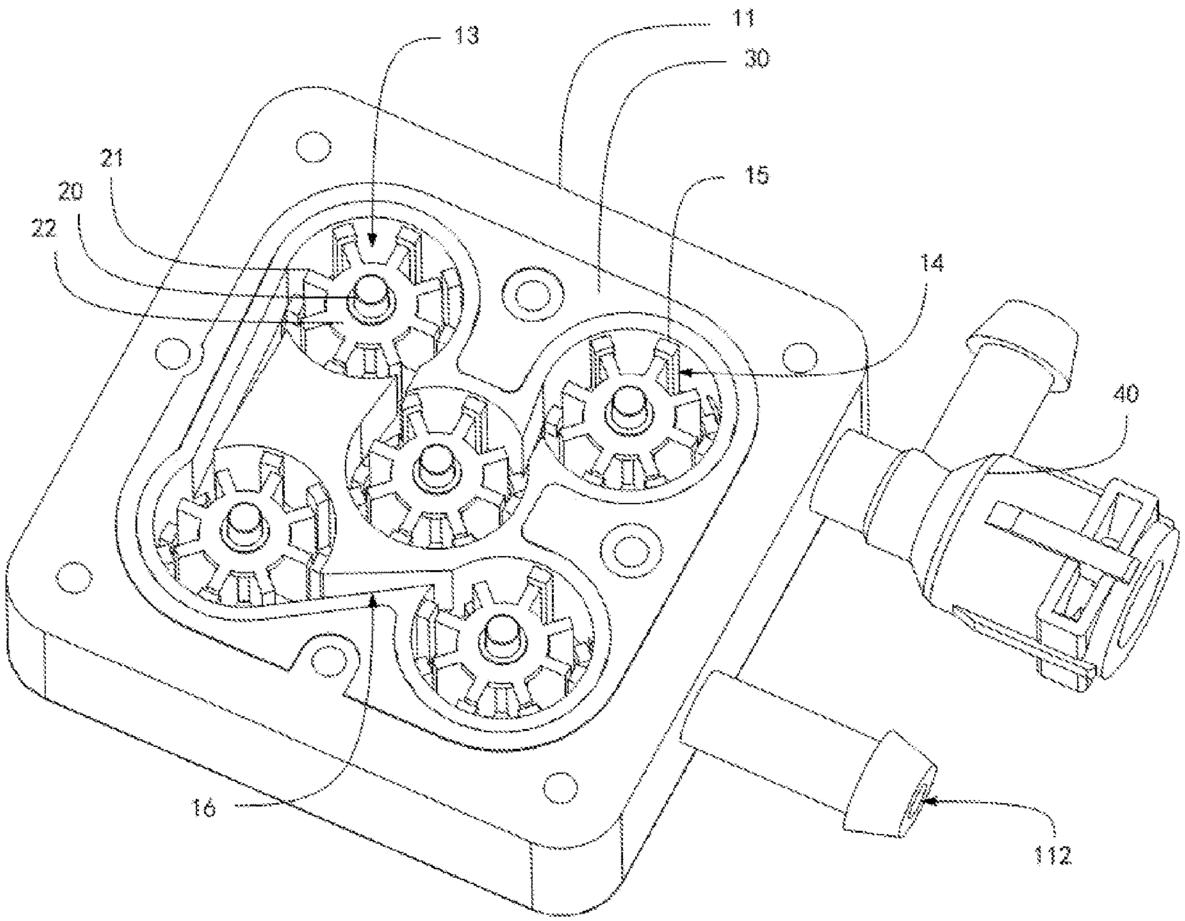
FIG. 2 is a structural view of the supercharger in FIG. 1 with a cover removed.

As shown in FIG. 1 or FIG. 2, in some embodiment of the present disclosure, the supercharger 100 includes a housing 10. An accommodating cavity 13 is formed in the housing 10, the housing 10 is provided with a gas-liquid inlet 111 and an outlet 112 communicating with the accommodating cavity 113, and an impact interface 14 is provided in the accommodating cavity 13.

A gas-liquid mixture enters the accommodating cavity 13 from the gas-liquid inlet 111 and impacts on the impact interface 14.

The supercharger 100 proposed in the present disclosure is designed to dissolve carbon dioxide in a liquid to prepare carbonated water. The accommodating cavity 13 is formed in the housing 10 of the supercharger 100, the housing 10 is provided with the gas-liquid inlet 111 and the outlet 112 communicating with the accommodating cavity 113, and the impact interface 14 is provided in the accommodating cavity 13, such that the gas-liquid mixture with the preset pressure is injected into the accommodating cavity 13 through the gas-liquid inlet 111, the gas-liquid mixture can impact on the impact interface 14 and stop instantaneously or change the gas-liquid flow direction, so as to generate an instantaneous pressure several times the normal pressure under the action of inertia, such that carbon dioxide can be better dissolved in the liquid to obtain carbonated water with high solute concentration. After the carbonated water solution with high solute concentration is obtained, the solution can be discharged out of the accommodating cavity 13 through the outlet 112.

Figure 5:
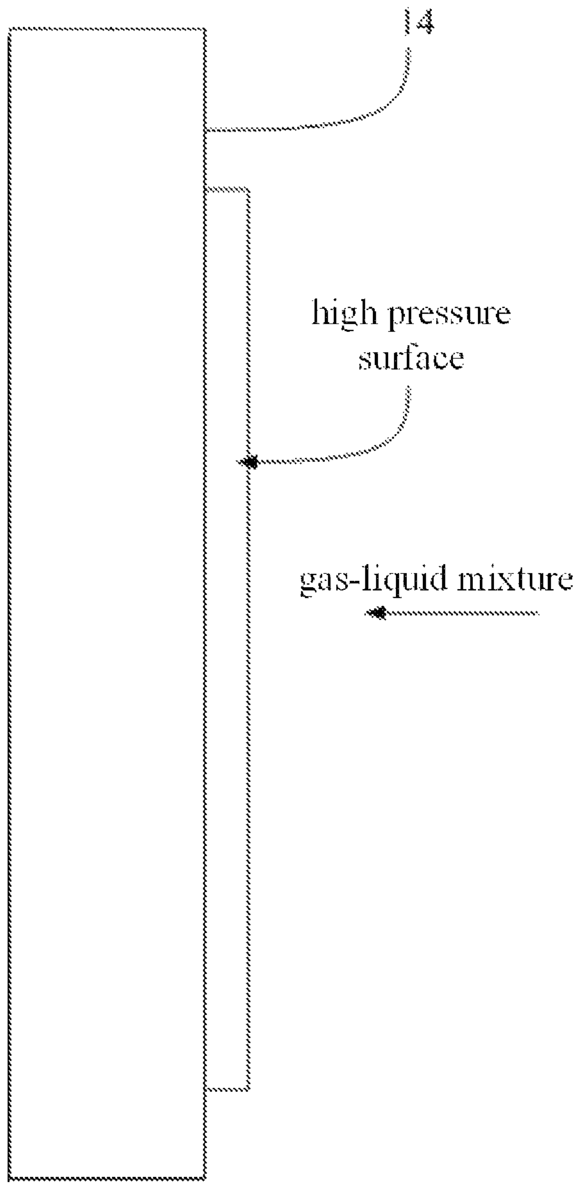
FIG. 5 is a schematic diagram of the supercharger of the present disclosure.

It should be noted that the gas-liquid mixture moving at high speed in the supercharger 100 has a certain momentum. When the gas-liquid mixture impacts on the impact interface 14, part of the gas-liquid mixture that impacts on the impact interface 14 will stop flowing instantly. However, other parts of the gas-liquid mixture adjacent to this part of the gas-liquid mixture still maintain their original motion state due to inertial action. Therefore, the part of the gas-liquid mixture impacting on the impact interface 14 can be compressed to form a high pressure surface with high energy density and very high local pressure at the impact interface 14. As shown in FIG. 5, when the fluid moving at high speed in the pressurized pipeline changes sharply, an instantaneous pressure several times the normal pipeline pressure will be generated in the pipe wall due to inertial action in a short time, which is called the water hammer effect. The present disclosure utilizes the water hammer effect, both water and gas moving at high speed have kinetic energy, the gas-liquid mixture impacts on the impact interface 14, and when water and gas stop instantaneously, their own kinetic energy will be converted into impulse. Thus, a solution pressure much higher than the normal pressure is instantaneously generated to increase the solubility of carbon dioxide in the liquid, which is generated based on the momentum theorem.

Specifically, the impulse formula can be:

$$I=Ft$$

The momentum formula can be:

$$p=mV$$

According to the momentum theorem, in a certain time interval, the impulse of the resultant force on the mass point is equal to the momentum change of the mass point at the same time. From this, the momentum conservation formula can be deduced:

$$Ft=mV$$

In the above equation:

I is the impulse of the gas-liquid mixture.

p is the momentum of the gas-liquid mixture.

F is the force of the gas-liquid mixture on the impact interface.

t is the action time between the gas-liquid mixture and the impact interface.

m is the mass of the gas-liquid mixture.

V is the flow rate of the gas-liquid mixture.

It can be seen that when the momentum change of the gas-liquid mixture remains constant, the shorter the action time between the gas-liquid mixture and the impact interface is, the greater the force of the gas-liquid mixture on the impact interface 14 is. Therefore, when the carbon dioxide moving at high speed and the liquid impact on the impact interface 14 at the same time, the gas-liquid mixture undergoes a high momentum change in a short period of time, an impact force much higher than the normal pressure is formed on the impact interface 14, thereby enhancing the solubility of carbon dioxide in the liquid at the impact interface 14.

Therefore, it can be understood that, in technical solutions of the present disclosure, an impact interface 14 is provided in the accommodating cavity 13 of the housing 10. When the gas-liquid mixture with the preset pressure is injected into the accommodating cavity 13 from the gas-liquid inlet 111, the gas-liquid mixture is instantly stationary due to the impact on the impact interface 14, it is possible to generate an instantaneous pressure several times the normal pressure under the action of inertia, so that carbon dioxide is dissolved in the liquid, and the solubility of carbon dioxide in the liquid is improved. That is, the technical solution of the present disclosure utilizes the supercharger 100 for gas-liquid mixing, so that high-pressure carbon dioxide up to 50-70 MPa is not required to be injected into the liquid storage bottle and mixed with the liquid, better carbon dioxide dissolution effect can be achieved just by mixing carbon dioxide and liquid below 1 MPa, which avoids the problem that the liquid storage bottle is opened or the liquid storage bottle explodes caused by using high-pressure carbon dioxide, thereby improving the use safety and convenience of the carbonated water mixing device.

The impact interface 14 can be a hard surface. Specifically, the impact interface 14 can be the cavity wall of the accommodating cavity 13, or can be as described in the following embodiments, that is, a rib 15 is protruded on the inner wall of the accommodating cavity 13, and an impact interface 14 is formed on the side wall of the rib 15. The specific implementation manner can be set according to actual needs, which is not limited herein.

Figure 3:
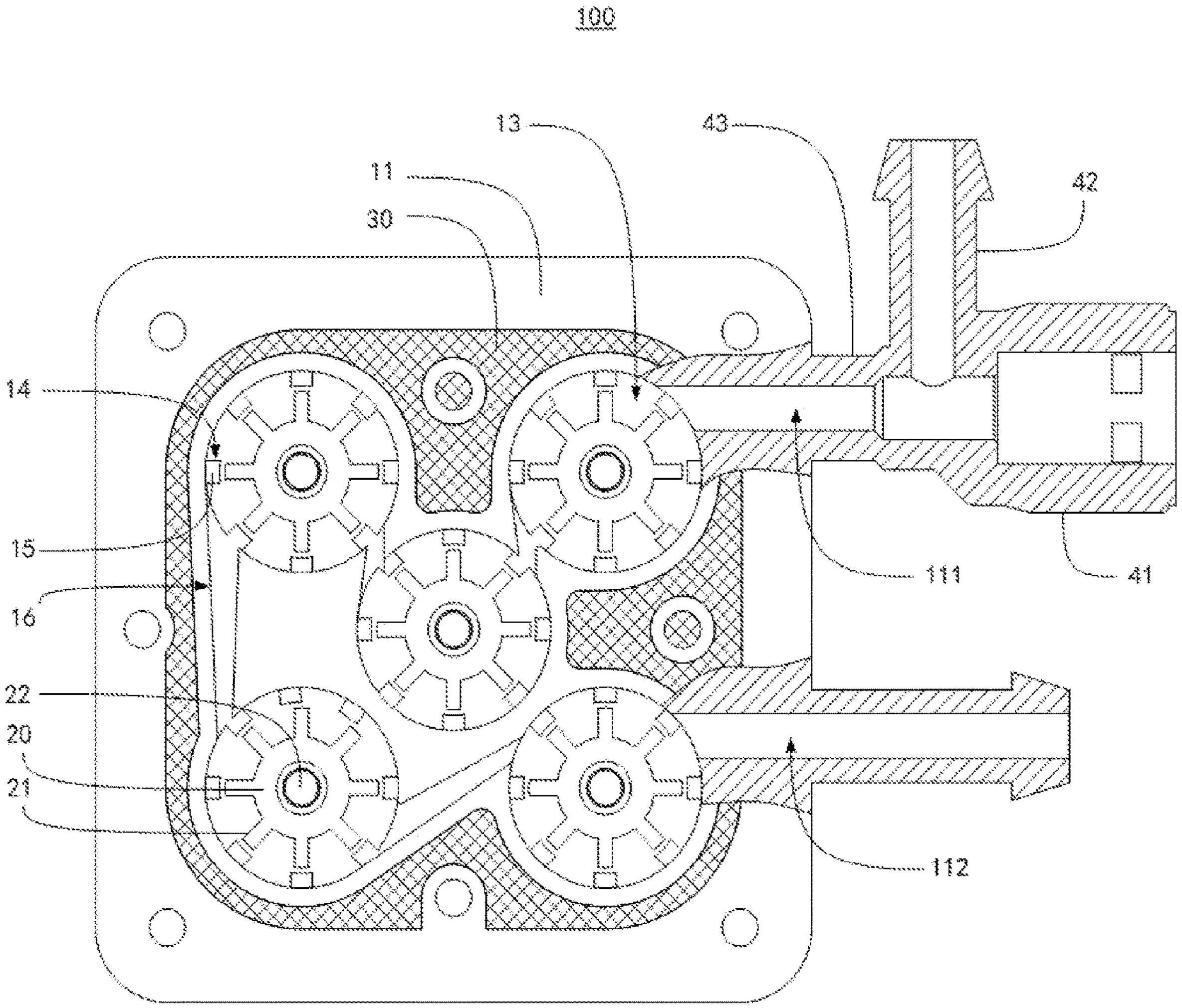
FIG. 3 is a sectional view of the supercharger in FIG. 1.

Further, as shown in FIG. 2 or FIG. 3, in some embodiments of the present disclosure, the supercharger 100 further includes an impeller 20. The impeller 20 is rotatably provided in the accommodating cavity 13, the gas-liquid inlet 111 is provided on a periphery of the impeller 20. The impact interface 14 is disposed outside the impeller 20 and is spaced from the impeller 20, so that when the gas-liquid mixture is thrown out from the impeller 20, it can impact on the impact interface 14.

In this embodiment, the accommodating cavity 13 is provided with a rotating shaft 22, and the impeller 20 is provided on the rotating shaft 22 and can rotate along the direction of the water flow. The impeller 20 is also provided with a plurality of blades 21 along the circumferential direction, and the gas-liquid inlet 111 is provided on the periphery of the impeller 20 and corresponding to the blade 21. When the gas-liquid mixture enters the accommodating cavity 13, the gas-liquid mixture can directly impact the blade 21 and drive the impeller 20 to rotate in the direction of the fluid. Therefore, the impeller 20 can play the role of separating and equally dividing the water-gas mixture, so that the carbon dioxide and the liquid can be fully contacted, and the effect of dissolving the carbon dioxide is improved. There are also a plurality of impact interfaces 14 on the periphery of the impeller 20, and there is a gap between the impact interface 14 and the impeller 20, so as not to hinder the rotation of the impeller 20. Therefore, when the rotation of the impeller 20 drives the gas-liquid mixture adjacent the impeller 20 to rotate, due to the centrifugal effect, the gas-liquid mixture can be thrown out from the impeller 20, and can impact on the impact interface 14 provided on the periphery of the impeller 20. Using the water hammer effect, a solution pressure much higher than the normal pressure can be obtained on the impact interface 14, so that the carbon dioxide can be better dissolved in the liquid.

It should be noted that, due to the difference in density between carbon dioxide and liquid, the gas-liquid mixture in the accommodating cavity 13 tends to form a layered configuration under the action of gravity, causing that water and gas are separated from each other, thereby reducing the total contact area between the gas phase and the liquid phase, and reducing the chance of carbon dioxide dissolving in the liquid. When the impeller 20 rotates, the blades 21 arranged along the circumferential direction of the impeller 20 will rotate accordingly. In this way, the gas-liquid two-phase flow can be continuously separated and equally divided and the separation of water and gas can be destroyed to form a fine dispersion system, so that the fine droplets or bubbles are evenly dispersed in the continuous phase. Therefore, the carbon dioxide can be fully contacted with the liquid, which has a better dissolution effect.

As shown in FIG. 2 or FIG. 3, in some embodiments of the present disclosure, a plurality of ribs 15 are protruded from the inner wall of the accommodating cavity 13. The plurality of ribs 15 are provided along the circumferential direction of the impeller 20, and the impact interface 14 is formed on the side wall of the rib 15 towards the impeller 20.

In this embodiment, the plurality of ribs 15 are protruded from the inner wall of the accommodating cavity 13. The ribs 15 are provided along the circumferential direction of the impeller 20 and are spaced apart from the impeller 20 to prevent the ribs 15 from hindering the rotation of the impeller 20. The impact interface 14 is formed on the side wall of the rib 15 towards the impeller 20. In this way, when the gas-liquid mixture rotating at a high speed is thrown out from the rotating impeller 20, it can directly hit the side of the rib 15 downstream, thus, an instantaneous pressure several times the normal pressure is generated, thereby increasing the solubility of carbon dioxide in the liquid.

As shown in FIG. 2 or FIG. 3, in some embodiments of the present disclosure, the housing 10 is formed with a plurality of the accommodating cavities 13 connected in sequence. The gas-liquid inlet 111 communicates with the first accommodating cavity 13, and the outlet 112 communicates with the last accommodating cavity 13, and each of the accommodating chambers 13 is provided with the impeller 20 and the impact interface 14.

In this embodiment, a plurality of accommodating cavities 13 are formed in the housing 10 in sequence. The gas-liquid inlet 111 communicates with the first accommodating cavity 13, and the outlet 112 communicates with the last accommodating cavity 13. Each accommodating cavity 13 is provided with an impeller 20 and an impact interface 14 along the circumferential direction of the impeller 20.

It can be understood that as described in the above embodiments, when the gas-liquid mixture enters the accommodating cavity 13, it can drive the impeller 20 in the accommodating cavity 13 to rotate in the direction of the water flow. Due to the centrifugal effect, the gas-liquid mixture can be thrown from the impeller 20 and impact on the impact interface 14 provided on the periphery of the impeller 20, and an instantaneous pressure several times the normal pressure will be generated, thereby improving the solubility of carbon dioxide. That is, a single accommodating cavity 13 is sufficient to increase the solubility of carbon dioxide, and if multiple accommodating cavities 13 are connected in series, the gas-liquid mixture entering the supercharger 100 can repeat the above process of increasing the solubility of carbon dioxide many times. As a result, carbon dioxide can be further dissolved in the liquid, thereby obtaining a solution with a high solute concentration.

Since each accommodating cavity 13 has undergone the above-mentioned process of increasing the carbon dioxide dissolution, carbon dioxide is continuously dissolved in the liquid, the volume of the fluid in the accommodating cavity 13 will continue to decrease, and the pressure in the accommodating cavity 13 will also decrease accordingly. In some embodiments, the cross-sectional area of the channel 16 between two adjacent accommodating cavities 13 gradually decreases along the water flow direction. Under certain conditions, since the diameter section of the pipe through which the liquid flows becomes smaller, the flow velocity increases. According to Bernoulli's principle, the flow velocity increases at the outlet where the section becomes smaller, which helps to increase the speed of the impeller 20 and the kinetic energy of the impact, thereby improving the solubility of the gas-liquid mixture in the next accommodating cavity 13.

As shown in FIG. 2 or FIG. 3, in some embodiments of the present disclosure, the channel outlet of the channel 16 is provided towards the impeller 20 at the outlet end of the channel.

In this embodiment, the channel 16 between the adjacent accommodating cavities 13 is disposed towards the impeller 20 at the outlet end of the channel, and is approximately tangent to the impeller 20. In this way, the gas-liquid mixture in the previous accommodating cavity 13 can directly impact on the blades 21 of the next impeller 20 along the channel 16 to drive the next impeller 20 to rotate, so that the gas-liquid mixture can be thrown onto the impact interface 14. It can be understood that the channel 16 is tangent to the two adjacent impellers 20, which can avoid the loss of kinetic energy of the gas-liquid mixture as much as possible, so that the impellers 20 can rotate at high speed. In this way, the impeller 20 can effectively divide and mix the gas phase and the liquid phase in the accommodating cavity 13, and the gas-liquid mixture can also generate a large instantaneous pressure during the collision pressurization, thereby realizing the dissolution of carbon dioxide in the liquid.

Further, as shown in FIG. 3, in some embodiments of the present disclosure, the cross-sectional area of the channel 16 gradually decreases along the direction of water flow.

In this embodiment, the cross-sectional area of the channel 16 communicating two adjacent accommodating cavities 13 will gradually decrease along the water flow direction. When the inner diameter of the channel 16 gradually becomes smaller, the flow velocity of the liquid in the channel 16 will become faster. Therefore, the gas-liquid mixture flowing through the channel 16 has a faster flow rate and impact force, and can keep moving in its flow direction and further accelerate. Therefore, after leaving the channel 16, the gas-liquid mixture can obtain higher kinetic energy, and when it impacts on the blades 21 of the impeller 20, the rotation speed of the impeller 20 can be increased. In this way, the impeller 20 can more effectively divide and mix the gas phase and the liquid phase in the accommodating cavity 13, and the gas-liquid mixture impacting on the impact interface 14 can also instantly cause a greater change in momentum, so that the carbon dioxide has a better dissolution effect.

As shown in FIG. 1 or FIG. 3, in some embodiments of the present disclosure, the supercharger 100 further includes a throttle valve, the throttle valve communicates with the outlet 112, and the outlet 112 is configured as an orifice.

In this embodiment, the supercharger 100 has an outlet 112 that communicates with the accommodating cavity 13, and the solution can flow out from the outlet 112. If a throttle valve is provided at the outlet 112, by adjusting the throttle valve to an appropriate opening degree, the flow rate of the solution discharged from the outlet 112 can be controlled, and the high-pressure chaotic fluid in the supercharger 100 that has undergone collision and pressurization can be converted into a conventional continuous fluid. This arrangement is beneficial for the carbonated water mixing device to distribute the solution flowing out of the outlet 112, and can also maintain the pressure at the outlet 112, thereby ensuring a higher water level in the accommodating cavity 13, and further improving the dissolution effect of carbon dioxide. Of course, at this time, the relatively low pressure outside the outlet 112, such as atmospheric pressure, can also rapidly release the pressure accumulated in the supercharger 100 through the outlet 112, thereby improving the use safety of the supercharger 100.

In another feasible embodiment, the outlet 112 can also be set as an orifice. The flow through the orifice can be changed by changing the flow area of the orifice. The flow area of the orifice can be set according to the parameters of the supercharger 100 to control the flow rate of the solution discharged from the outlet 112. Therefore, the orifice can also have the beneficial effect brought about by arranging the throttle valve at the outlet 112 as described in the above embodiments.

As shown in FIG. 3, in some embodiments of the present disclosure, the supercharger 100 further includes a tee joint 40. The tee joint 40 includes an air inlet joint 41, a liquid inlet joint 42 and a connection joint 43, and the connection joint 43 is communicated with the gas-liquid inlet 111.

In this embodiment, the supercharger 100 further includes the tee joint 40. The tee joint 40 is provided outside the accommodating cavity 13 and communicates with the accommodating cavity 13. The tee joint 40 includes the air inlet joint 41, the liquid inlet joint 42 and the connection joint 43. The connecting joint 43 is provided at the gas-liquid inlet 111 and communicates with the gas-liquid inlet 111. The carbon dioxide can enter the tee joint 40 through the inlet joint 41, and the liquid can enter the tee joint 40 through the liquid inlet joint 42. In this way, the gas-liquid mixture can be formed in the tee joint 40, and the gas-liquid mixture can enter the accommodating cavity 13 through the connecting joint 43.

It should be noted that the carbon dioxide entering the inlet joint 41 is equal in pressure to the liquid entering the liquid inlet joint 42. For example, carbon dioxide with an output pressure of 6-8 $kg/cm^2$ can enter the inlet joint 41, and a liquid with a water pressure of 6-8 $kg/cm^2$ can enter the liquid inlet joint 42. If one of the carbon dioxide pressure or the liquid pressure is too high, the carbon dioxide or liquid may be poured backward in the tee joint 40, thus the gas-liquid mixture cannot enter the accommodating cavity 13, and the supercharger 100 cannot work normally. In some embodiments, in order to avoid gas-liquid backflow, one-way valves can be added to the carbon dioxide input end and the liquid input end.

Figure 4:
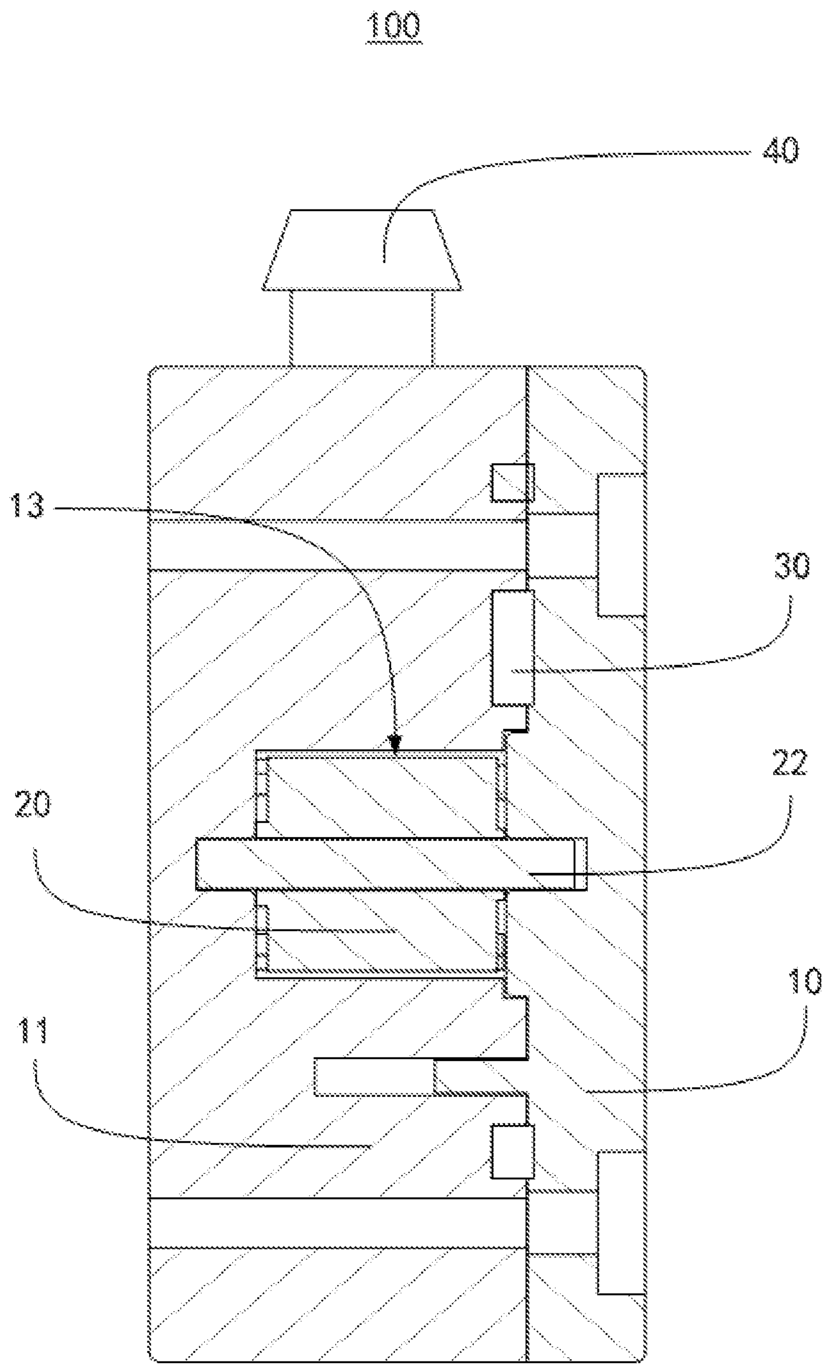
FIG. 4 is another sectional view of the supercharger in FIG. 1.

As shown in FIG. 1 or FIG. 4, in some embodiments of the present disclosure, the housing 10 includes:

an outer casing 11, an accommodating space with an opening being formed on the outer casing 11, the outer casing 11 being provided with the gas-liquid inlet 111 and the outlet 112 communicating with the accommodating space; and a cover 12, the cover 12 being covered on the opening to be enclosed with the outer casing 11 to form the accommodating cavity 13.

In this embodiment, the housing 10 includes an outer casing 11 and a cover 12. An accommodating space is formed in the outer casing 11. The cover 12 is covered on the outer casing 11 and is enclosed with the outer casing 11 to form an accommodating cavity 13. The outer casing 11 is also provided with the gas-liquid inlet 111 and the outlet 112 intersecting with the accommodating cavity 13, and the outer casing 11 and the cover 12 are detachably connected. In some embodiments, the supercharger 100 further includes an impeller 20, and the impeller 20 is provided in the accommodating space. Such arrangement is beneficial to the installation of the impeller 20. The outer casing 11 can be connected to the cover 12 by threads, or can be connected to the outer casing 11 and the cover 12 through fasteners. The fasteners can be bolts in the following embodiments, which will not be repeated herein.

In a feasible embodiment, the cover 12 and the outer casing 11 are fixedly connected by bolts, and the cover 12 is provided with a countersunk hole larger than the outer diameter of the bolt. The end face of the outer casing 11 facing the cover 12 is correspondingly provided with screw holes, and the bolts can be provided in the countersunk holes and are threadedly connected with the outer casing 11, thereby locking the cover 12 on the outer casing 11. In this way, the housing 10 has a stable mounting structure, so as to have better stability and reliability.

As shown in FIG. 4, in some embodiments of the present disclosure, the supercharger 100 further includes a sealing member 30. The sealing member 30 is provided around a circumference of the opening, and is sandwiched between the outer casing 11 and the cover 12.

In this embodiment, the cover 12 and the outer casing 11 are enclosed to form the accommodating cavity 13, and the sealing member 30 is provided between the cover 12 and the outer casing 11, and the sealing member 30 is provided around the edge of the accommodating cavity 13. This arrangement can make the supercharger 100 have better air tightness, avoid the phenomenon of gas leakage or liquid leakage, so as to ensure the pressure in the accommodating cavity 13, thereby improving the dissolving effect of carbon dioxide.

In a feasible embodiment, the sealing member 30 is provided with a through hole. The bolts described in the foregoing embodiments can be connected to the outer casing 11 through the through holes, so that the sealing member 30 is firmly installed between the outer casing 11 and the cover 12. In this way, the sealing member 30 can be fixed to improve the positional stability of the sealing member 30 and prevent the sealing member 30 from slipping or loosening, thereby ensuring the sealing performance of the supercharger 100. In some embodiments, a groove can also be provided on the end face of the outer casing 11 facing the cover 12, the groove is provided around the periphery of the accommodating cavity 13, and the sealing member 30 is provided in the groove and can abut with the end face of the cover 12 facing the outer casing 11. Alternatively, a groove can be formed on the cover 12, and the sealing member 30 is provided in the groove and abuts against the end surface of the outer casing 11 facing the cover 12. The specific implementation manner can be set according to actual needs, which is not limited herein.

The present disclosure further provides a carbonated water mixing device, including the supercharger 100 described in the foregoing embodiments. Since the carbonated water mixing device can apply the technical solutions in all the foregoing embodiments, it has at least all the beneficial effects brought about by the technical solutions of the foregoing embodiments, and will not be repeated herein.

In a feasible embodiment, the carbonated water mixing device is used to prepare carbonated water. Optionally, when the inlet joint 41 is connected to carbon dioxide with an output pressure of 6-8 $kg/cm^2$, and the liquid inlet joint 42 is connected to liquid with a water pressure of 6-8 $kg/cm^2$ and a temperature of 4 degrees Celsius, the carbonated water mixing device of the present disclosure can prepare carbonated water with carbonization level reaching 4.5V/V. Compared with the technical solution of directly injecting carbon dioxide with a pressure of up to 50-70 MPa into the liquid storage bottle, and mixing with the liquid in the liquid storage bottle to prepare carbonated water, the carbonated water prepared by the technical solution of the present disclosure has a high carbonation concentration, and the carbonated water mixing device of the present disclosure also has better safety and convenience of use.

The above are only some embodiments of the present disclosure, and do not limit the scope of the present disclosure thereto. Under the inventive concept of the present disclosure, equivalent structural transformations made according to the description and drawings of the present disclosure, or direct/indirect application in other related technical fields are included in the scope of the present disclosure.

What is claimed is:

1. A supercharger, comprising:

a housing, wherein a plurality of the accommodating cavities are formed in the housing, the housing is provided with a gas-liquid inlet and an outlet communicating with the accommodating cavity, an impact interface is provided in the accommodating cavity, and the gas-liquid inlet is configured for a gas-liquid mixture to enter the accommodating cavity and impact on the impact interface; and an impeller rotatably provided in the accommodating cavity, wherein the gas-liquid inlet is provided on a periphery of the impeller, ribs are protruded on an inner wall of the accommodating cavity, the ribs are spaced from the impeller, and side walls of the ribs form the impact interface; and wherein a channel communicating two accommodating cavities is provided between side walls of the two accommodating cavities adjacent to each other, and each of the two accommodating cavities is provided with the impeller and the impact interface, the gas-liquid inlet is communicated with a first accommodating cavity, and the outlet is communicated with a last accommodating cavity.

2. The supercharger of claim 1, wherein a plurality of ribs are protruded on the inner wall of the accommodating cavity, and the plurality of ribs are spaced apart along a circumference of the impeller.

3. The supercharger of claim 1, wherein a channel outlet of the channel is provided towards the impeller at an outlet end of the channel.

4. The supercharger of claim 1, wherein a cross-sectional area of the channel is gradually decreased along a direction of water flow.

5. The supercharger of claim 1, further comprising:

a throttle valve communicated with the outlet; and/or a tee joint, wherein the tee joint comprises an air inlet joint, a liquid inlet joint and a connection joint, and the connection joint is communicated with the gas-liquid inlet.

6. The supercharger of claim 1, wherein the housing comprises:

an outer casing, an accommodating space with an opening being formed on the outer casing, the outer casing being provided with the gas-liquid inlet and the outlet communicating with the accommodating space; and a cover, the cover being covered on the opening to be enclosed with the outer casing to form the accommodating cavity.

7. The supercharger of claim 6, further comprising:

a sealing member, wherein the sealing member is provided around a circumference of the opening, and is sandwiched between the outer casing and the cover.

8. A carbonated water mixing device, comprising the supercharger of claim 1.

* * * * *